United States Patent
Miyaoh

[11] Patent Number: 6,019,376
[45] Date of Patent: Feb. 1, 2000

[54] METAL LAMINATE GASKET WITH WIDE AND NARROW FLANGE PORTIONS

[75] Inventor: Yoshio Miyaoh, Tokyo, Japan

[73] Assignee: Ishikawa Gasket Co., Ltd., Tokyo, Japan

[21] Appl. No.: 09/082,479

[22] Filed: May 21, 1998

[30] Foreign Application Priority Data

Jul. 17, 1997 [JP] Japan ................................. 9-192183

[51] Int. Cl.⁷ ....................................................... F02F 11/00
[52] U.S. Cl. ......................... 277/593; 277/595; 277/600
[58] Field of Search ................................. 277/590, 591, 277/592, 593, 594, 595, 600, 611

[56] References Cited

U.S. PATENT DOCUMENTS

| | | | |
|---|---|---|---|
| 4,284,282 | 8/1981 | Lonne ...................................... | 277/600 |
| 4,834,399 | 5/1989 | Udagawa et al. ....................... | 277/593 |
| 5,169,163 | 12/1992 | Udagawa et al. ....................... | 277/593 |
| 5,277,433 | 1/1994 | Ishikawa et al. ........................ | 277/593 |
| 5,286,039 | 2/1994 | Kawaguchi et al. .................... | 277/593 |
| 5,700,016 | 12/1997 | Miyaoh et al. .......................... | 277/591 |

*Primary Examiner*—Anthony Knight
*Assistant Examiner*—Patrick Szymkowicz
*Attorney, Agent, or Firm*—Kanesaka & Takeuchi

[57] ABSTRACT

A metal laminate gasket of the invention is used for an internal combustion engine having a sealing hole and a plurality of bolt holes situated around the sealing hole. The gasket is formed of first and second metal plates having holes corresponding to the sealing hole and the bolt holes of the engine. The second metal plate includes a base portion, a curved portion extending from the base portion to define one hole therein and located inside one hole in the first plate, and a flange extending from the curved portion and disposed over the first plate. The flange has a plurality of wide flange portions and narrow flange portions alternately arranged to each other such that the wide flange portions are located near the bolt holes to support high tightening pressures applied thereto. A bead may be formed on one or both of the first and second plates outside the flange. The bead may have wide and narrow portions to provide equal surface pressures as a whole.

8 Claims, 1 Drawing Sheet

METAL LAMINATE GASKET WITH WIDE AND NARROW FLANGE PORTIONS

BACKGROUND OF THE INVENTION AND RELATED ART STATEMENT

The present invention relates to a metal laminate gasket with narrow and wide flange portions alternately arranged to each other to securely seal around a hole in an internal combustion engine.

A metal gasket or metal laminate gasket is installed between two engine parts to securely seal around sealing holes. In the engine, since high pressure and temperature are formed in or around the sealing holes, there have been proposed many sealing mechanisms.

In the engine, high temperature and pressure are generally formed in a cylinder bore. Therefore, in a cylinder head gasket, bolts for connecting a cylinder head and a cylinder block are arranged around the cylinder bore to secure seal around the cylinder bore.

In this case, if a high tightening pressures are applied immediately outside the cylinder bore, the cylinder bore may deform due to the high tightening pressures applied from the bolts. Therefore, in the engine, the high tightening pressures should not be simply applied around the cylinder bore.

In one type of the convention gaskets, the gasket is formed of two or three plates, such as U.S. Pat. No. 4,898,396 and U.S. Pat. No. 5,213,345. A first metal plate is turned around a hole or cylinder bore to be sealed to form a flange disposed above a base portion of the first metal plate, and a second metal plate is located on the base portion. The second metal plate may be situated between the flange and the base portion, or may not overlap the flange. A bead or sealing device is formed on one of the first and second plates to surround the cylinder bore.

In this gasket, when the gasket is tightened with high tightening pressures by bolts, portions on the flange near the bolts receive high tightening pressures from the bolts. Namely, high tightening pressures are applied at portions near the bolt holes around the cylinder bore, while the low tightening pressures are formed in other portions around the cylinder bore. Thus, when the tightening pressures around the sealing hole or cylinder bore are considered as a whole, the high and low tightening pressures are formed around the cylinder bore. Namely, the tightening pressures are not properly distributed around the cylinder bore to possibly cause leakage from the cylinder bore or deformation of the cylinder bore.

In order to securely seal around the hole, parts of the bead away from the bolt holes may be arranged to provide high surface pressure, such as disclosed in U.S. Pat. No. 4,759,556. On the other hand, a spring constant of one bead may be partly changed to securely seal around a hole, such as disclosed in U.S. Pat. No. 5,269,541.

The conventional gaskets operate properly, as intended. However, it is still required to improve a sealing quality and prevent deformation of the cylinder bore.

The present invention has been made in view of the conventional gaskets, and an object of the invention is to provide a metal laminate gasket which can securely seal around a hole to be sealed.

Another object of the invention is to provide a metal laminate gasket as stated above, wherein influences by local tightening pressures by bolts are minimized.

A further object of the invention is to provide a metal laminate gasket as stated above, wherein an area around the hole to be sealed can receive an equal tightening pressure.

Further objects and advantages of the invention will be apparent from the following description of the invention.

SUMMARY OF THE INVENTION

A metal laminate gasket of the invention is used for an internal combustion engine having a sealing hole and a plurality of bolt holes situated around the sealing hole. The gasket is formed of a first metal plate having first and second holes corresponding to the sealing hole and the bolt holes of the engine, respectively, and a second metal plate piled with the first metal plate and having third and fourth holes corresponding to the sealing hole and bolt holes of the engine, respectively.

The second metal plate includes a base portion extending throughout an entire area of the gasket, a curved portion extending from the base portion to define the third hole therein and located inside the first hole, and a flange extending from the curved portion and disposed over the first metal plate. The flange includes a plurality of wide flange portions and narrow flange portions alternately arranged to each other. The wide flange portions are located near the second and fourth holes, i.e. bolt holes, to support high tightening pressures applied thereto, and the narrow flange portions are located away from the bolt holes.

When the gasket is tightened, the portions close to the bolt holes receive high tightening pressures. Therefore, the wide flange portions are formed close to the bolt holes. As a result, the tightening pressures are widely supported by the wide flange portions. As a whole, there are obtained substantially equal tightening pressures around the hole to be sealed.

It is preferable that the narrow flange portions have constant widths, and the wide flange portions have curved edges extending from the narrow flange portions toward the respective second and fourth holes located close to the respective wide flange portions.

The gasket may be provided with at least one bead formed on at least one of the first and second metal plates and surrounding the first and third holes outside the flange. The bead may have a constant width, but it may include a plurality of wide bead portions and narrow bead portions alternately arranged to each other. In this case, the narrow bead portions are located at portions away from second and fourth holes, i.e. bolt holes, to provide high surface pressures thereat when the gasket is tightened.

The bead has intermediate portions, which are substantially the same as the narrow portions, between the respective second and fourth holes, i.e. bolt holes, adjacent to each other. The intermediate portions may be located close to the first and third holes, i.e. sealing hole, relative to other portions of the bead to provide sufficient surface pressures thereat.

Both of the first and second metal plates may have beads laminating each other around the first and third holes. Also, a coating layer may be situated between the first and second metal plates outside the flange to securely seal between the two plates.

DETAILED DESCRIPTION OF A PREFERRED EMBODIMENT

Figure 1:
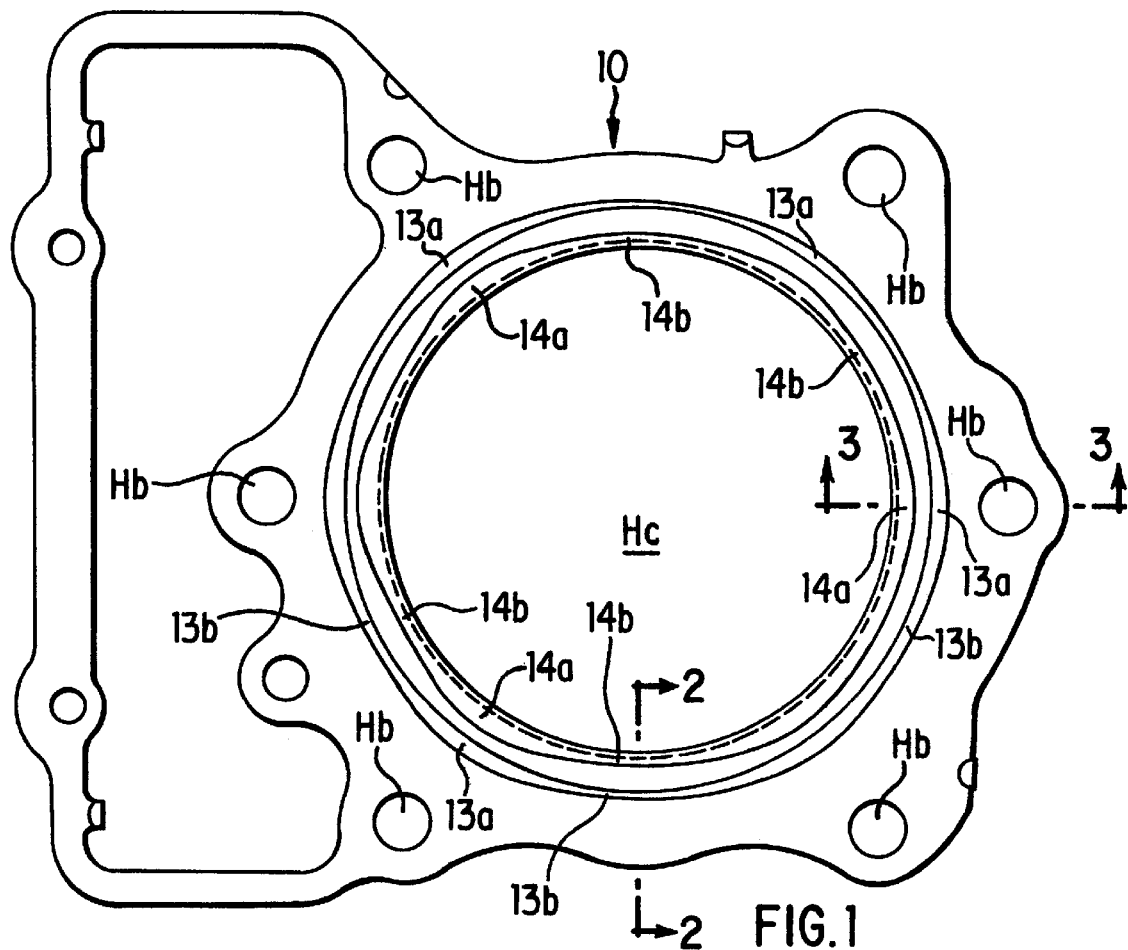
FIG. 1 is a plan view of a cylinder head gasket of the invention.
Figure 2:
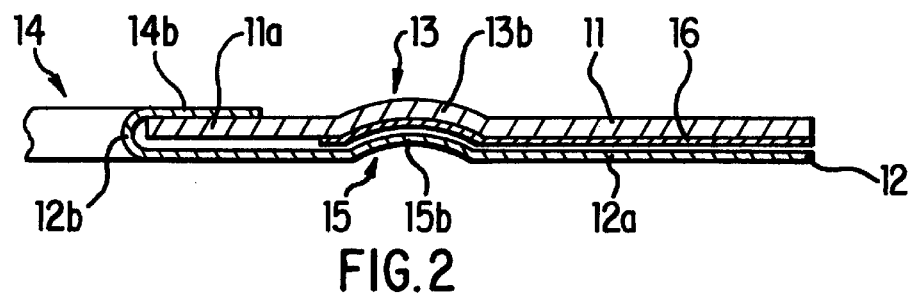
FIG. 2. is an enlarged cross sectional view taken along line 2—2 in FIG. 1.
Figure 3:
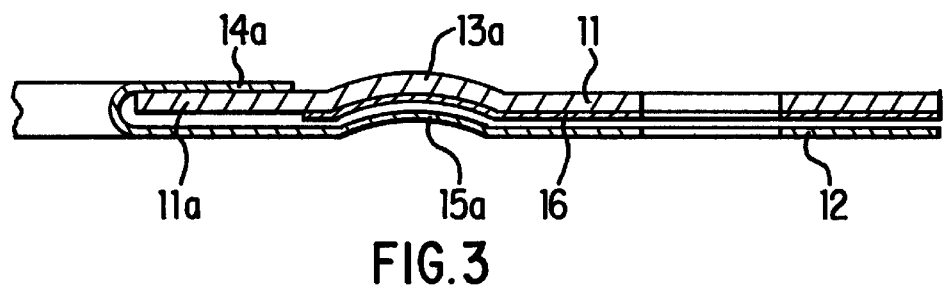
FIG. 3. is an enlarged cross sectional view taken along line 3—3 in FIG. 1.

With reference to FIGS. 1–3, a gasket 10 of the invention applied to a cylinder head gasket will be explained.

An engine (not shown) used in the gasket is a type such that a cylinder block is provided with a plurality of cylinder bores, to which a plurality of cylinder heads, each having one cylinder bore, is attached. However, the invention may be applied to a regular engine formed of one cylinder block and one cylinder head and having a plurality of cylinder bores therein.

The gasket 10 has one cylinder bore Hc, and a plurality of bolt holes Hb situated around the cylinder bore Hc. The gasket 10 is formed of an upper metal plate 11, a lower metal plate 12 situated under the upper plate 11, and a coating layer 16 situated between the upper plate 11 and the lower plate 12. The upper and lower plates 11, 12 include holes corresponding to the cylinder bore Hc and bolt holes Hb. The upper plate 11 is made thicker than the lower plate 12.

The upper plate 11 includes an edge portion 11a around the cylinder bore Hc, and a bead 13 surrounding the edge portion 11a. The lower plate 12 includes a base portion 12a situated under the upper plate 11, a curved portion 12b extending upwardly from the base portion 12a, and a flange 14 extending from the curved portion 12b and located above the edge portion 11a of the upper plate 11. A bead 15 is also formed in the lower plate 12 to be located under the bead 13.

The flange 14 located above the edge portion 11a includes wide portions 14a, and narrow portions 14b arranged alternately. The wide portions 14a are located at portions closed to the bolt holes Hb, while the narrow portions 14b are located at portions away from the bolt holes Hb, i.e. between the bolt holes Hb. The outer edges of the narrow portions 14b are curved concentrically with respect to the cylinder bore Hc. However, the outer edges of the wide portions 14a project or curve toward the respective bolt holes Hb to have wide areas.

The coating layer 16 is fixed to the upper plate 11 outside the edge portion 11a to prevent fluid from flowing between the plates 11, 12. Since the coating layer 16 is not located near the cylinder bore Hc, the coating layer 16 may contain a material not strong against high temperature and pressure but suitable to seal fluid. The coating layer 16 may be made of a resin or rubber, such as fluorine resin or rubber, NBR and so on.

In the gasket 10, since the wide portions 14a project toward the bolt holes Hb, when the gasket situated between the cylinder head and cylinder block (both not shown) is tightened, high tightening pressures formed by bolts disposed in the bolt holes Hb are supported widely by the wide portions 14a close to the bolt holes Hb. Thus, as a whole, substantially equal tightening pressures are applied around the cylinder bore Hc.

In the gasket 10 of the invention, the beads 13, 15 are formed outside the flange 14. The bead 13 has wide portions 13a and narrow portions 13b arranged alternately. The wide portions 13a are located close to the bolt holes Hb, while the narrow portions 13b are located away from the bolt holes Hb, i.e. between the bolt holes. Similarly, the bead 15 has wide portions 15a and narrow portions 15b arranged alternately. The wide portions 15a are located under the wide portions 13a close to the bolt holes Hb, and the narrow portions 15b are located under the narrow portions 13b away from the bolt holes Hb.

When the gasket 10 is tightened, the wide portions 13a, 15a are relatively easily compressed as compared to the narrow portions 13b, 15b, and the narrow portions 13b, 15b provide surface pressures greater than those of the wide portions 13a, 15a. Since the narrow portions 13b, 15b are located away from the bolt holes Hb, when the gasket is tightened, the narrow portions 13b, 15b are compressed less than that of the wide portions 13a, 15a. In considering the locations and compression degrees of the wide and narrow portions of the beads, since the narrow portions 13b, 15b are located away from the bolt holes Hb, when the gasket is tightened, as a whole, the beads 13, 15 provide substantially equal surface pressures thereon.

Also, in the gasket of the invention, the centers of the narrow portions 13b, 15b of the beads, 13, 15 are located slightly closer to the edge of the cylinder bore Hc than the centers of the wide portions 13a, 15b. Accordingly, a relatively strong sealing pressures are formed on the narrow portions 13b, 15b where a relatively weak tightening pressures are formed. When the gasket is compressed, as a whole, substantially equal surface pressures are formed on the beads 13, 15 to thereby securely seal around the cylinder bore Hc.

In the invention, the flange 14 has the narrow and wide portions 14a, 14b, wherein the high tightening pressures exerted from the bolts are supported by the wide portions 14a, and the tightening pressures less than the high tightening pressures are supported by the narrow portions 14b. This structure can help preventing deformation of the cylinder bore due to the unbalanced tightening pressures received from the bolts. Also, the cylinder bore Hc can be securely sealed.

In the invention, also, since at least one bead is formed outside the flange, the cylinder bore Hc can be securely sealed by the bead. In this respect, if a regular bead with constant height and width is formed, such regular bead can securely seal around the cylinder bore Hc.

However, in case the bead includes the wide and narrow portions, the bead can provide surface pressures substantially equally throughout the entire area of the bead with reference to the tightening pressures applied from the bolts. In case the positions of the bead relative to the edge of the cylinder bore Hc are slightly changed according to the wide and narrow portions of the bead, the sealing ability of the bead is improved. As a whole, the cylinder bore Hc can be securely sealed in the invention.

While the invention has been explained with reference to the specific embodiment of the invention, the explanation is illustrative and the invention is limited only by the appended claims.

What is claimed is:

1. A metal laminate gasket for an internal combustion engine having a sealing hole and a plurality of bolt holes situated around the sealing hole, comprising:

a first metal plate having first and second holes corresponding to the sealing hole and the bolt holes of the engine, respectively, and a second metal plate piled with the first metal plate and having third and fourth holes corresponding to the sealing hole and bolt holes of the engine, respectively, said second metal plate including a base portion extending throughout an entire area of the gasket, a curved portion extending from the base portion to define the third hole therein and located inside the first hole, and a flange extending from the curved portion and disposed over the first metal plate, said flange having a plurality of wide flange portions and narrow flange portions alternately arranged to each other such that the wide flange portions are located near the second and fourth holes to support high tightening pressures applied thereto.

2. A metal laminate gasket according to claim 1, wherein said narrow flange portions have constant widths, said wide flange portions having curved edges extending from the narrow flange portions toward the respective second and fourth holes located close to the respective wide flange portions.

3. A metal laminate gasket according to claim 2, further comprising at least one bead formed on at least one of the first and second metal plates, said bead surround the first and third holes outside the flange.

4. A metal laminate gasket according to claim 3, wherein said bead includes a plurality of wide bead portions and narrow bead portions alternately arranged to each other, said narrow bead portions being located at portions away from the second and fourth holes to provide high surface pressures thereat.

5. A metal laminate gasket according to claim 4, wherein said narrow bead portions are located close to the first and third holes relative to the wide bead portions.

6. A metal laminate gasket according to claim 3, wherein said bead has intermediate portions between the respective second and fourth holes adjacent to each other, said intermediate portions being located close to the first and third holes relative to other portions of the bead to provide sufficient surface pressures thereat.

7. A metal laminate gasket according to claim 3, wherein said first and second metal plates have beads laminating each other around the first and third holes.

8. A metal laminate gasket according to claim 7, further comprising a coating layer situated between the first and second metal plates outside the flange.

* * * * *